United States Patent Office 3,062,709
Patented Nov. 6, 1962

3,062,709
INSECTICIDE FORMULATIONS
Eugene P. Ordas, Chicago, Ill., assignor to Velsicol Chemical Corporation, Chicago, Ill., a corporation of Illinois
No Drawing. Filed Aug. 30, 1960, Ser. No. 52,789
9 Claims. (Cl. 167—30)

This invention relates to insecticide compositions and to methods of stabilizing them. More particularly, the present invention relates to dry formulations of certain halogenated insecticides.

Dry formulations of halogenated insecticides fall into three main classifications, namely dust bases or concentrates, wettable powders, and granular formulations. Dusts and granular formulations differ primarily in particle size of the carrier or diluent used. For example, a typical dust formulation may comprise an insecticide dispersed in a solid carrier having a particle size smaller than about 325 mesh. A typical granular formulation would comprise an insecticide dispersed in a solid carrier having a particle size of about 16/30 or about 20/40 mesh. A typical wettable powder comprises an insecticide and a solid carrier having a particle size of the order of that used for dust formulations, in conjunction with wetting and dispersing agents.

Typically, a granular formulation may contain from about 2% to about 40% insecticide by weight. This type of formulation is generally used as such without further dilution with an insecticidally inert carrier in such fields as agriculture.

Typically, a dust formulation can contain about 0.25% insecticide up to about 50% insecticide by weight. Frequently, the dust formulations are first prepared as so-called "concentrates" which contain typically from about 10% to about 75% insecticide dispersed with a carrier, and such "concentrate" is further diluted to a so-called "field strength" dust typically having an insecticide concentration of about 0.25% to about 5%, varying with the use desired and the potency of the toxicant. The wettable powders typically contain a concentration of toxicant on the order of that contained in dust concentrates as above described. However, they are diluted to "field strength" by dispersing in water rather than by dispersing with an inert diluent.

The toxicant ingredient of the dry insecticide formulations which is stabilized by the present invention is selected from that class of insect toxicants which are derived from hexachlorocyclopentadiene such as chlordane, heptachlor, aldrin, isodrin, dieldrin, or endrin, either in their pure or technical form.

The toxicant ingredient may also be selected from that class of insect toxicants which are thiophosphoric acid derivatives such as malathion, parathion, or methyl parathion, either in their pure or technical form.

The carriers or diluents generally used with these insect toxicants, and which in their normal state are active in deteriorating the aforesaid classes of toxicants when mixed herewith, without treatment as specified in the present invention, are solids of the class consisting of kaolin clays, montmorillonite clays, attapulgite clays, diatomaceous earths, and vermiculites.

Examples of useful carrier materials are kaoline, such as kaolinite, dickite, nacrite, anauxite, halloysite, and indellite; montmorillonites, such as beidellite, nontromite, nontmorillonite, hectorite, saponite, sauconite, and bentonite; attapulgites, such as fuller's earth, attapulgite, and epiolite; diatomaceous earths, such as diatomite and ieselguhr; and vermiculite, such as biotite.

The inert diluents generally used with these insect toxicant formulations are such inert solids as talc, pyrophyllite, frianite, pumice, and the like.

Having now described the types of formulations herein concerned, the insect toxicants employed, and the carriers and diluents used, a brief discussion of the problem encountered in such formulations will be helpful in understanding the present invention.

While the solid carriers above discussed are very useful in formulating the herein defined toxicants for reasons of their inexpensiveness, availability, ease of handling, absorbency characteristics, durability, and other desirable physical properties, they have the disadvantageous property, to varying degrees, of degrading or decomposing the insect toxicant when intimately mixed therewith. While this degrading action is a slow process when most of the insect toxicants described herein are used, it is relatively rapid when the insect toxicant is endrin or methyl parathion. Whether slow or rapid, this process is significant and troublesome since dry formulations are often prepared as concentrates or even field strength materials and then stored for periods which may be as long as a year or more. During this storage period the effect of the carrier or diluent on the insect toxicant ingredient may reduce its effectiveness to the point where satisfactory insect control under field conditions is no longer obtainable.

The nature of the reaction or effect of the carriers on the insecticide has never been fully elucidated. The rate of toxicant deterioration may vary by the action of different carriers or diluents.

To solve the present problem it has been found necessary to neutralize the activity of the solid carriers and diluents so that they are inert to the insect toxicant and will allow protracted storage of dry insecticide formulations without deterioration of insecticidal activity of such formulation.

Since the formulations herein concerned are used preponderantly in agriculture, any treatment of the carriers and diluents used must necessarily not render the formulation unfit for agricultural use on food and forage crops at time of harvest. Thus, the treatment must not render the formulation phytotoxic. The treatment must likewise not be hazardous from a warm-blooded animal toxicity standpoint, or otherwise increase the hazard in the utilization of insecticide formulations. Also, of primary importance, and considering the economics involved, the treatment must not involve expensive materials, nor can the process of treatment be complex. Another consideration in the present problem is that the treatment must not affect the insecticidal activity of the toxicant employed.

It is therefore an object of the present invention to provide an additive to dry insecticide formulations which will prevent deterioration of the insect toxicant ingredient during storage.

It is another object of the present invention to provide an additive to dry insecticide formulations, for the purpose of stabilizing them, which is neither acidic nor basic, and which is relatively nontoxic.

It is another object of the present invention to provide an additive to dry insecticide formulations, for the purpose of stabilizing them, which is not deleterious to plant life.

Further, it is an object of the present invention to stabilize dry insecticide formulations by inexpensive means and by use of readily available ingredients.

It has now been found that the solid carriers and diluents which were previously described and which are active in deteriorating the classes of insecticides herein concerned can be made substantially inert by the addition of a small amount of dimethyl sulfoxide. It is surprising and unexpected that dimethyl sulfoxide should be as effective as it is, since it is chemically and physically unlike compounds previously used for this purpose and further because it is neutral insofar as pH is concerned.

Thus its effectiveness as a stabilizing agent could not be predicted from the prior art.

Dimethyl sulfoxide has the beneficial effect of alleviating or eliminating degradation or deterioration of the insect toxicant ingredient in dry insecticide formulations when contained in such formulation in amounts varying between about 1% to about 14% by weight based on the weight of carrier of diluent contained in the formulation. A preferred concentration of dimethyl sulfoxide to dry insecticide formulation is about 1% to about 10% by weight of carrier or diluent.

The art of blending materials with solid carriers and diluents of the class described is well known, and the liquid dimethyl sulfoxide additive of the present invention can be blended with these solid materials by any known means. For example, the use of commercial type mixers or blenders is adequate. Dimethyl sulfoxide can be added to and blended with the solid carriers either alone or in combination with an inert, relatively volatile solvent which can be removed after blending. The dimethyl sulfoxide can be added to and blended with the solid carriers prior to blending the insect toxicant therewith.

In the alternative, the dimethyl sulfoxide can be added to the solid carriers during the same blending operation wherein mixing of the insect toxicant and carrier is achieved. Dimethyl sulfoxide can also be added to the liquid phase of those insect toxicants having a decomposition rate less than the deactivation rate of the carrier used therewith, such as heptachlor, chlordane, aldrin, and dieldrin. It is preferred to preblend the dimethyl sulfoxide to the carrier before blending the insect toxicant.

The following specific information exemplifies the beneficial effect of dimethyl sulfoxide herein disclosed, using attapulgite and montmorillonite clays of size to pass through a 325-mesh screen as representative of the solid carriers and diluents.

The surface acidity of a solid carrier or diluent has been found to be an accurate measure of the toxicant-degrading activity of the carrier or diluent. The surface acidity can readily be measured by the method of Walling, Cheves, J. Am. Chem. Soc., 72 pp. 1164–68 (1950), which depends upon the ability of the carrier or diluent to change a neutral-base color indicator to its acidic color. Suitable neutral-base color indicators for this use are p-dimethylaminoazobenzene and benzene azodiphenylamine. Each of the above indicators is used in an iso-octane solution of 1 mg. indicator per ml. of iso-octane. To test the surface acidity of the solid carrier, diluent, or formulation, one-quarter gram of the latter material is placed into a depression of a spot-test plate and a few drops of the indicator solution as described herein is added thereto.

The change in color of the indicator solution indicates a surface acidity greater or lesser than the ionization constant of the indicator. This ionization constant is represented by the symbol pKa.

Since the ionization constant (pKa) is inversely related to the activity of the solid carrier, diluent, or formulation, a low pKa signifies high degrading activity, while a higher pKa denotes a lower level of such activity. It has been found that solid carriers and diluents having a pKa of about 1.5 or higher are suitable for stable chlordane and heptachlor formulations, while endrin and methyl parathion toxicants require carriers and diluents having a pKa of about 3.3 or higher. The indicator p-dimethylaminoazobenzene is especially useful since it accurately measures the pKa at the 3.3 level, while benzene azodiphenylamine measures the pKa at the 1.5 level.

Table I illustrates the surface acidity of some of the common solid carriers:

*Table I*

| Mineral Carrier | Surface Acidity (pKa) |
|---|---|
| Attapulgite clay | less than 1. |
| Kaolin clay | less than 1. |
| Diatomaceous Earth | 1. |
| Montmorillonite clay | less than 1. |

Thus it can readily be seen that the carriers listed in Table I will not form stable formulations when combined with the insect toxicants described herein. However, stable formulations can be prepared when the formulation is stabilized by decreasing the activity of the carrier in accordance with the present invention. For instance, the following table illustrates the successful treatment of the carriers, as shown by spot-test color changes above the critical ionization constants as noted:

*Table II*

| Mineral Carrier | Dimethyl Sulfoxide Added, Percent | Color Change At pKa Indicated |
|---|---|---|
| 1. Attapulgite clay | 6 | 1.5 |
| 2. Attapulgite clay | 8 | 3.3 |
| 3. Montmorillonite clay | 9 | 1.5 |
| 4. Montmorillonite clay | 9 | 3.3 |

The treated carriers listed in the above table can be successfully blended with the insect toxicants herein described to form stable formulations. Thus attapulgite clay treated by blending with 6% dimethyl sulfoxide can be used to prepare stable formulations with those insect toxicants which require carriers and diluents having an activity represented by a pKa of not less than 1.5, namely chlordane and heptachlor; while attapulgite clay treated with 8% dimethyl sulfoxide has an activity represented by a pKa of not less than 3.3 and may be used to prepare stable formulations with all of the insect toxicants described herein.

Similarly, montmorillonite clay treated with 9% dimethyl sulfoxide will form stable formulations with all the insect toxicants described here, since said treatment decreases the degrading activity of the clay to above the 3.3 pKa level.

Likewise insect toxicant formulations containing the other solid carriers and diluents of the classes described herein and optionally containing other agents, such as synergists, spreading agents, dispersing agents, wetting agents, and the like are successfully stabilized by the addition of small quantities of dimethyl sulfoxide, while formulations lacking the last mentioned ingredient often rapidly lose their toxicant strength due to the decomposition of the toxicant upon standing, especially at increased temperatures and for prolonged periods of time.

Dimethyl sulfoxide is valuable for use on the carriers and diluents previously mentioned and represented by the classes attapulgites, kaolins, montmorillonites, diatomaceous earths, and vermiculites. Dimethyl sulfoxide is effective on these carriers and diluents regardless of the particle size thereof, or formulation type, such as whether they be in a dust form, wettable powder form or granular form.

As previously stated, dimethyl sulfoxide is useful in stabilizing dry formulations of the class, dusts, wettable powders and granular formulations of those polychlorinated insect toxicants derived from hexachlorocyclopentadiene and typified by endrin, aldrin, isodrin, dieldrin, heptachlor, and chlordane, and of those insect toxicants which are thiophosphoric acid derivatives and which are specifically typified by malathion, parathion, and methyl parathion.

I claim:
1. A stabilized insecticidal composition comprising an insect toxicant selected from the group consisting of endrin, isodrin, aldrin, dieldrin, chlordane, heptachlor, malathion, parathion, and methyl parathion; a finely divided solid carrier active in deteriorating said insect toxicant mixed therewith selected from the group consisting of kaolin clay, montmorillonite clay, attapulgite clay, diatomaceous earth and vermiculite; and dimethyl sulfoxide.

2. A stabilized insecticidal composition comprising an insect toxicant selected from the group consisting of endrin, isodrin, aldrin, dieldrin, chlordane, heptachlor, malathion, parathion, and methyl parathion; a finely divided solid carrier active in deteriorating said insect toxicant mixed therewith selected from the group consisting of kaolin clay, montmorillonite clay, attapulgite clay, diatomaceous earth and vermiculite; and between about 2% and 14% by weight of the carrier of dimethyl sulfoxide.

3. A stablized insecticidal composition comprising endrin; a finely divided solid carrier active in deteriorating said insect toxicant mixed therewith selected from the group consisting of kaolin clay, montmorillonite clay, attapulgite clay, diatomaceous earth and vermiculite; and between about 2% and about 14% by weight of the carrier of dimethyl sulfoxide.

4. A stabilized insecticidal composition comprising aldrin; a finely divided solid carrier active in deteriorating said insect toxicant mixed therewith selected from the group consisting of kaolin clay, montmorillonite clay, attapulgite clay, diatomaceous earth and vermiculite; and between about 2% and about 14% by weight of the carrier of dimethyl sulfoxide.

5. A stabilized insecticidal composition comprising chlordane; a finely divided solid carrier active in deteriorating said insect toxicant mixed therewith selected from the group consisting of kaolin clay, monmorillonite clay, attapulgite clay, diatomaceous earth and vermiculite; and between about 2% and about 14% by weight of the carrier of dimethyl sulfoxide.

6. A stabilized insecticidal composition comprising heptachlor; a finely divided solid carrier active in deteriorating said insect toxicant mixed therewith selected from the group consisting of kaolin clay, montmorillonite clay, attapulgite clay, diatomaceous earth and vermiculite; and between about 2% and 14% by weight of the carrier of dimethyl sulfoxide.

7. A stabilized insecticidal composition comprising malathion; a finely divided solid carrier active in deteriorating said insect toxicant mixed therewith selected from the group consisting of kaolin clay, montmorillonite clay, attapulgite clay, diatomaceous earth and vermiculite; and between about 2% and 14% by weight of the carrier of dimethyl sulfoxide.

8. A stabilized insecticidal composition comprising an insect toxicant, a finely divided solid carrier therefor active in deteriorating said toxicant on storage, and dimethyl sulfoxide as a storage stabilizing agent for neutralizing said deteriorating effect.

9. The method of storage stabilizing an insecticidal composition comprising an insect toxicant and a finely divided solid carrier therefor active in deteriorating said toxicant on storage, which comprises adding thereto a storage stabilizing amount of dimethyl sulfoxide.

References Cited in the file of this patent

UNITED STATES PATENTS

| | | |
|---|---|---|
| 1,654,667 | Goodhue et al. | Oct. 6, 1953 |
| 2,677,617 | Thompson | May 4, 1954 |
| 2,868,688 | Benesi et al. | Jan. 13, 1959 |
| 2,957,799 | Goodhue et al. | Oct. 25, 1960 |
| 3,000,779 | Goodhue et al. | Sept. 19, 1961 |

FOREIGN PATENTS

| | | |
|---|---|---|
| 488,429 | Great Britain | July 6, 1938 |
| 567,002 | Great Britain | Jan. 24, 1945 |

OTHER REFERENCES

Handbook of Aldrin, Dieldrin and Endrin, Shell Chemical Corp., 460 Park Ave., New York 22, N.Y., pp. 21–23.

UNITED STATES PATENT OFFICE

CERTIFICATE OF CORRECTION

Patent No. 3,062,709                                            November 6, 1962

Eugene P. Ordas

It is hereby certified that error appears in the above numbered patent requiring correction and that the said Letters Patent should read as corrected below.

Column 6, lines 6 and 13, before "14%", each occurrence, insert -- about --.

Signed and sealed this 21st day of May 1963.

(SEAL)
Attest:

ERNEST W. SWIDER
Attesting Officer

DAVID L. LADD
Commissioner of Patents